United States Patent
Mori et al.

(10) Patent No.: US 11,102,172 B2
(45) Date of Patent: Aug. 24, 2021

(54) TRANSFER APPARATUS

(71) Applicant: ALAXALA Networks Corporation, Kawasaki (JP)

(72) Inventors: Shunsuke Mori, Kawasaki (JP); Yoshihisa Tanaka, Kawasaki (JP); Keigo Uchizumi, Kawasaki (JP)

(73) Assignee: ALAXALA NETWORKS CORPORATION, Kawasaki (JP)

( * ) Notice: Subject to any disclaimer, the term of this patent is extended or adjusted under 35 U.S.C. 154(b) by 0 days.

(21) Appl. No.: 16/713,210

(22) Filed: Dec. 13, 2019

(65) Prior Publication Data
US 2020/0228496 A1 Jul. 16, 2020

(30) Foreign Application Priority Data
Jan. 10, 2019 (JP) .............................. JP2019-002642

(51) Int. Cl.
H04L 29/12 (2006.01)
H04L 29/06 (2006.01)
H04L 29/08 (2006.01)

(52) U.S. Cl.
CPC ...... *H04L 61/6022* (2013.01); *H04L 61/2517* (2013.01); *H04L 63/0236* (2013.01); *H04L 69/168* (2013.01); *H04L 69/323* (2013.01)

(58) Field of Classification Search
CPC ............. H04L 61/6022; H04L 63/0236; H04L 69/323; H04L 69/168; H04L 61/2517
See application file for complete search history.

(56) References Cited

U.S. PATENT DOCUMENTS

2005/0216730 A1\* 9/2005 Morino ................... H04L 63/08
  713/153
2012/0331542 A1\* 12/2012 Halpern .............. H04L 63/1458
  726/13
2017/0063861 A1 3/2017 Uchizumi et al.

FOREIGN PATENT DOCUMENTS

JP 2015-159482 A 9/2015
JP 2017-046149 A 3/2017

\* cited by examiner

*Primary Examiner* — Brenda H Pham
(74) *Attorney, Agent, or Firm* — Mattingly & Malur, PC (57) ABSTRACT

A transfer apparatus comprises: a first storage unit configured to store a whitelist for storing reliable information indicating that communication between a source address and a destination address is authorized; a second storage unit configured to store an addition list including a specific address not included in the reliable information and a valid period of the specific address; a receiving unit configured to receive data; a check unit configured to check whether either a destination address or a source address included in data within the valid period is the specific address; and a generation unit configured to generate specific reliable information indicating that communication between the destination address and the source address included in the data is authorized and register the generated specific reliable information to the whitelist in a case where the check unit confirms within the valid period that either address is the specific address.

7 Claims, 9 Drawing Sheets

TRANSFER APPARATUS

CLAIM OF PRIORITY

The present application claims priority from Japanese patent application JP 2019-2642 filed on Jan. 10, 2019, the content of which is hereby incorporated by reference into this application.

BACKGROUND OF THE INVENTION

This invention relates to a transfer apparatus for transferring data.

In recent years, critical infrastructures such as a power plant have been required to take measures to prevent attackers from intruding their network to take over the control of the system. The network of a critical infrastructure is protected by a firewall device and antivirus software installed in the terminals such as personal computers. However, to prevent intrusion of an attacker who wants to take over the system control, more strong measures are required. To reduce the risk caused by intrusion of an attacker, there is an approach that utilizes a whitelist function. The whitelist function is to enhance the security level by registering information on authorized terminals included in information transmitted in authorized communication in the network to a whitelist storage device and blocking unauthorized communication from a terminal other than the authorized terminals registered in the whitelist storage device.

The background includes JP 2015-159482 and JP 2017-046149. JP 2015-159482 discloses "A network device has a transfer section which: holds learning information indicating whether or not addresses of a plurality of terminals can be learned, address information indicating packets that the network device transfers, and filter information indicating whether or not packet transfer is permitted; and transfers the packets on the basis of at least one of the address information and the filter information. The transfer section, when receiving the packets from a terminal, determines on the basis of the learning information whether or not the network device can learn the address when receiving the packets. When the network device can learn the address, the network device stores the address of a transmission source of the received packets in the address information, and when network device cannot learn the address, the network device does not store the address of the transmission source of the received packets in the address information but determines on the basis of the address included in the filter information whether or not the received packets should be transferred." (see the abstruct.)

JP 2017-046149 discloses "A communication device receives control information on first data received by a first data receiving unit and multiple types of header information on the first data, selects parameters from the multiple types of header information on the first data on the basis of the priority of a first data receiving unit group including the first data receiving unit indicated by priority information and accommodation conditions indicating the number of entries for a white list which a white list storage first memory can store, and adds an entry including the control information on the first data and the selected one or more parameters to the white list." (see the abstruct.)

The above-described whitelist function has a generation mode and an operation mode. The generation mode is used in a sterile period to construct a network, for example. The whitelist function in the generation mode allows communication apparatuses to communicate normally in a sterile period and generates a whitelist automatically. Thereafter, the whitelist function is shifted by the administrator from the generation mode to the operation mode to perform communication control that blocks unauthorized communication unregistered in the whitelist. Separating the generation mode and the operation mode enables automatic registration to the whitelist, which reduces the administrator's work.

SUMMARY OF THE INVENTION

To add a terminal newly permitted to communicate, the existing whitelist function accepts only manual addition in the operation mode. In order to do this, the administrator has to pick up the parameters of all communication to be added and input the parameters manually. For this reason, the administrator is obliged to do complicated works and suffers the risk of misconfiguration.

There is another approach that puts back the whitelist function into the generation mode before adding a new terminal to make the whitelist function returned to the generation mode register communication of the new terminal automatically. However, this approach requires a sterile condition like the one in the initial generation mode of the whitelist function. Accordingly, this method cannot be applied to a network that is difficult to put back to the sterile state once the operation is started.

This invention is to provide a transfer apparatus that allows transfer of data from a communication apparatus permitted to be added or transfer of data to the communication apparatus within a limited time period.

A transfer apparatus which is an aspect of the invention disclosed in the present application is a transfer apparatus comprising: a first storage unit configured to store a whitelist for storing reliable information indicating that communication between a source address and a destination address is authorized; a second storage unit configured to store an addition list including a specific address not included in the reliable information and a valid period of the specific address; a receiving unit configured to receive data; a check unit configured to check whether either a destination address or a source address included in data received at the receiving unit within the valid period is the specific address; and a generation unit configured to generate specific reliable information indicating that communication between the destination address and the source address included in the data is authorized and register the generated specific reliable information to the whitelist in a case where the check unit confirms within the valid period that either address is the specific address.

A representative embodiment of this invention allows transfer of data from a communication apparatus permitted to be added or transfer of data to the communication apparatus within a limited time period. Problems, configurations, and effects other than those described above are clarified in the following description of the embodiments.

DETAILED DESCRIPTION OF THE EMBODIMENTS

Configuration Example of Network

Figure 1:
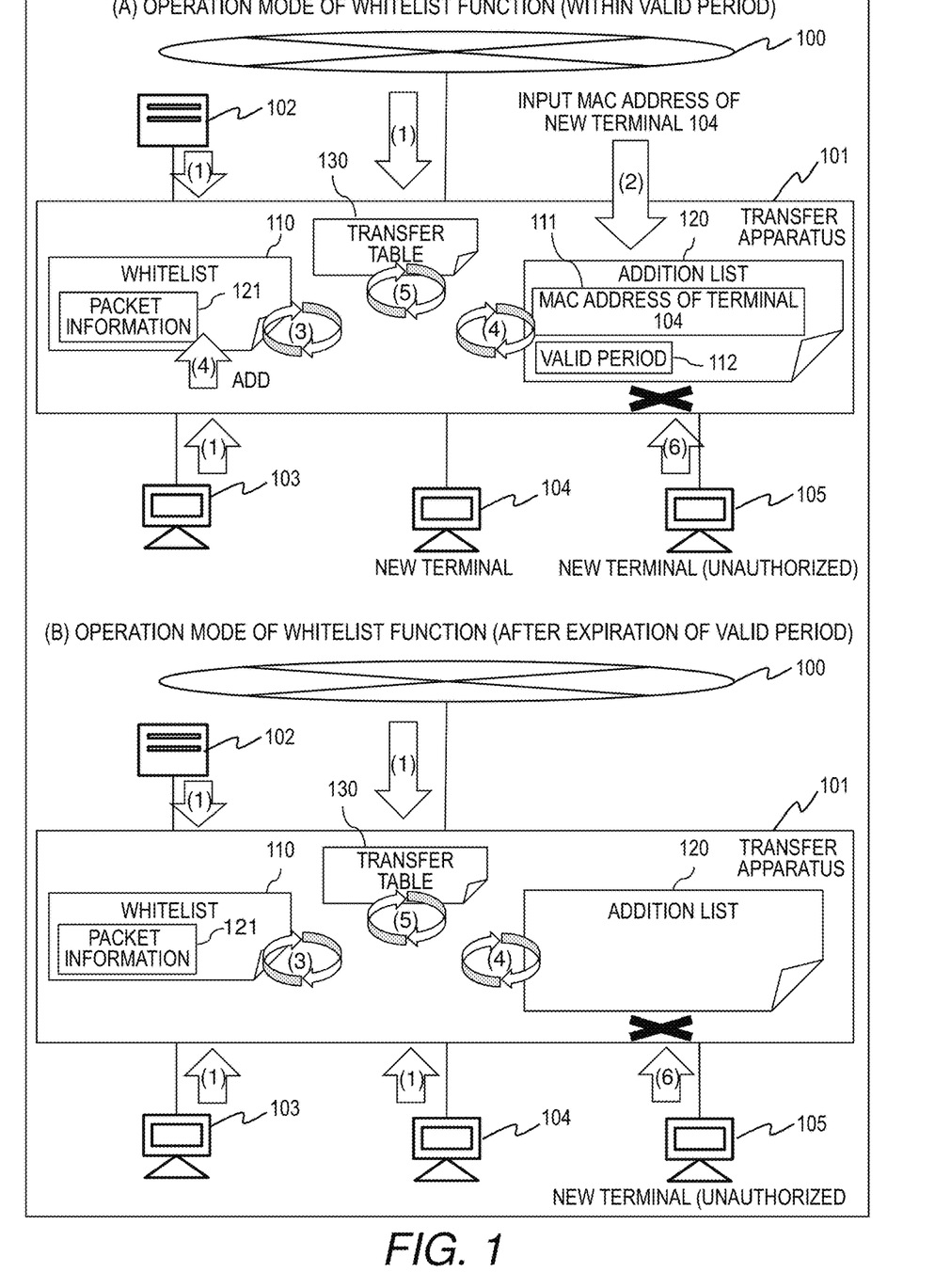
FIG. 1 is an explanatory diagram illustrating a configuration example of a network in this embodiment.

FIG. 1 is an explanatory diagram illustrating a configuration example of a network in this embodiment. A transfer apparatus 101 is a communication apparatus having a whitelist function; it is connected to be able to communicate with a network 100 such as the Internet. The whitelist function is a function that allows transfer of packets meeting packet information 121 registered in a whitelist 110 and rejects transfer of packets not meeting the packet information 121. The whitelist 110 is a list of packet information 121 on the packets permitted to be transferred by the transfer apparatus 101. The packet information 121 includes address information on a source and a destination.

The transfer apparatus 101 also has an addition list 120 storing the MAC address of a terminal whose packet information 121 is intended to be added to the whitelist 110. The transfer apparatus 101 further has a transfer table 130 to determine the destination. The transfer apparatus 101 learns the MAC addresses of connected terminals 102 and 103 and the port numbers connected with the terminals 102 and 103 by address resolution, for example, and stores them to the transfer table 130.

The terminals 102 and 103 are communication apparatuses included in the network 100; they are connected with the transfer apparatus 101 to be able to communicate. The terminals 104 and 105 are terminals to be newly added. Particularly, the terminal 105 is an unauthorized terminal that is not permitted to join the network 100. Assume that the terminals 104 and 105 are not connected with the transfer apparatus 101 until explicitly stated otherwise.

The pattern (A) in FIG. 1 illustrates an example of the operation of the transfer apparatus 101 when its whitelist function is in the operation mode (within a valid period 112). The valid period 112 is a period after the MAC address of a new terminal 104 that is not specified in the packet information 121 in the whitelist 110 is registered in the addition list 120 until it is deleted. Assume that the whitelist 110 in the pattern (A) includes packet information 121 specifying that the address of the terminal 102 can be either a source or a destination and packet information 121 specifying that the address of the terminal 103 can be either a source or a destination.

(1) Upon receipt of a packet, the transfer apparatus 101 checks the whitelist 110 for the packet information 121 on the received packet. If the packet information 121 on this packet is registered in the whitelist 110, the transfer apparatus 101 transfers the packet to the destination registered in the transfer table 130. If not registered in the whitelist 110, the transfer apparatus 101 discards the packet. The MAC addresses of the terminals 102 and 103 are registered in the transfer table 130 for determining the destination and packet information 121 on the packets having a source or a destination of the terminal 102 or 103 is registered in the whitelist 110. Accordingly, packets having a source or a destination of the terminal 102 or 103 are transferred by the transfer apparatus 101.

(2) Assume that the terminal 104 is connected to the transfer apparatus 101 after the phase (1). For example, the administrator inputs the MAC address of the new terminal 104 to the transfer apparatus 101. Upon receipt of the input, the transfer apparatus 101 registers the MAC address 111 of the terminal 104 and the valid period 112 to the addition list 120. The valid period 112 is the period for which the added entry is valid. The transfer apparatus 101 starts timekeeping of the valid period 112.

(3) Upon receipt of a packet having a source or a destination of the terminal 104 in the phase (2) before expiration of the valid period 112, the transfer apparatus 101 checks whether the packet information 121 on the packet is registered in the whitelist 110. Since the terminal 104 is a newly added communication apparatus, the packet information 121 on this packet is not registered in the whitelist 110.

(4) The transfer apparatus 101 searches the addition list 120 for the MAC address 111 of the terminal 104. Since the MAC address 111 of the terminal 104 is registered in the phase (2), the transfer apparatus 101 registers packet information 121 on the received packet to the whitelist 110.

(5) The transfer apparatus 101 searches the transfer table 130, determines the destination of the received packet, and sends out the packet. On this occasion, the transfer apparatus 101 registers the combination of the port number of the port where the packet is received and the MAC address of the terminal 104 of the source to the transfer table 130. In this phase, the transfer table 130 may not include the destination of a packet, for example in such a case where the transfer apparatus 101 receives a packet addressed to the terminal 104 before registering the MAC address of the terminal 104 to the transfer table 130. Then, the transfer apparatus 101 cannot determine a single port for the destination and accordingly, sends the packet to all ports except for the port where the packet is received.

(6) Assume that the terminal 105 is connected to the transfer apparatus 101 in the phase (2) before expiration of the valid period 112. The MAC address of the terminal 105 is not registered in the addition list 120. For this reason, the transfer apparatus 101 does not add the packet information 121 on the packets having a source or a destination of the terminal 105 to the whitelist 110. As a result, when the unauthorized terminal 105 is connected, communication therefrom or thereto can be blocked to ensure the security.

The pattern (B) in FIG. 1 illustrates an example of the operation of the transfer apparatus 101 when its whitelist function is in the operation mode (after expiration of the valid period 112 in the pattern (A)). Upon expiration of the valid period 112, the transfer apparatus 101 deletes the MAC address 111 of the terminal 104 and the valid period 112 from the addition list 120. In the pattern (B), the MAC addresses of the terminals 102 to 104 are registered in the transfer table 130 for determining the destination as described in the phases (1) and (5) of the pattern (A), the packet information 121 on the packets having a source or a destination of the terminal 102, 103, or 104 is registered in the whitelist 110. Accordingly, packets having a source or a destination of the terminal 102, 103, or 104 are transferred by the transfer apparatus 101.

In the pattern (B), the MAC address of the terminal 105 is not registered in the addition list 120 as described in the phase (6) of the pattern (A). Accordingly, the transfer apparatus 101 does not add the packet information 121 on the packets having a source or a destination of the terminal 105 to the whitelist 110. As a result, when the unauthorized terminal 105 is connected, communication therefrom or thereto can be blocked to ensure the security.

As understood from the above, the transfer apparatus 101 can add packet information 121 to the whitelist 110 when the whitelist function is in the operation mode without switching to the generation mode. Accordingly, registration to the whitelist 110 is available if the administrator inputs the MAC address 111 of the newly added terminal 104; the administrator does not need to pick up the communication parameters other than the MAC address. Hence, the load to the administrator or misregistration to the whitelist 110 is reduced.

Meanwhile, since the whitelist function does not need to be switched to the generation mode, the operation of the whitelist function is not interrupted. Accordingly, the security of the network communication improves. In addition, no switching to the generation mode eliminates the necessity to secure a sterile state in constructing a network. Accordingly, this transfer apparatus 101 is applicable to a network that is difficult to put back to a sterile state once the operation is started.

This feature is accomplished in a transfer apparatus 101 that does not have a whitelist 110. Specifically, the transfer apparatus 101 can be configured to determine whether to transfer or discard a packet within a valid period 112, allow transfer of a packet from or to the terminal 104 in the valid period 112 if the addition list 120 includes the MAC address 111 of the terminal 104, and discard a packet from or to the terminal 104 if the addition list 120 does not include the MAC address 111 of the terminal 104.

Configuration Example of Transfer Apparatus 101

Figure 2:
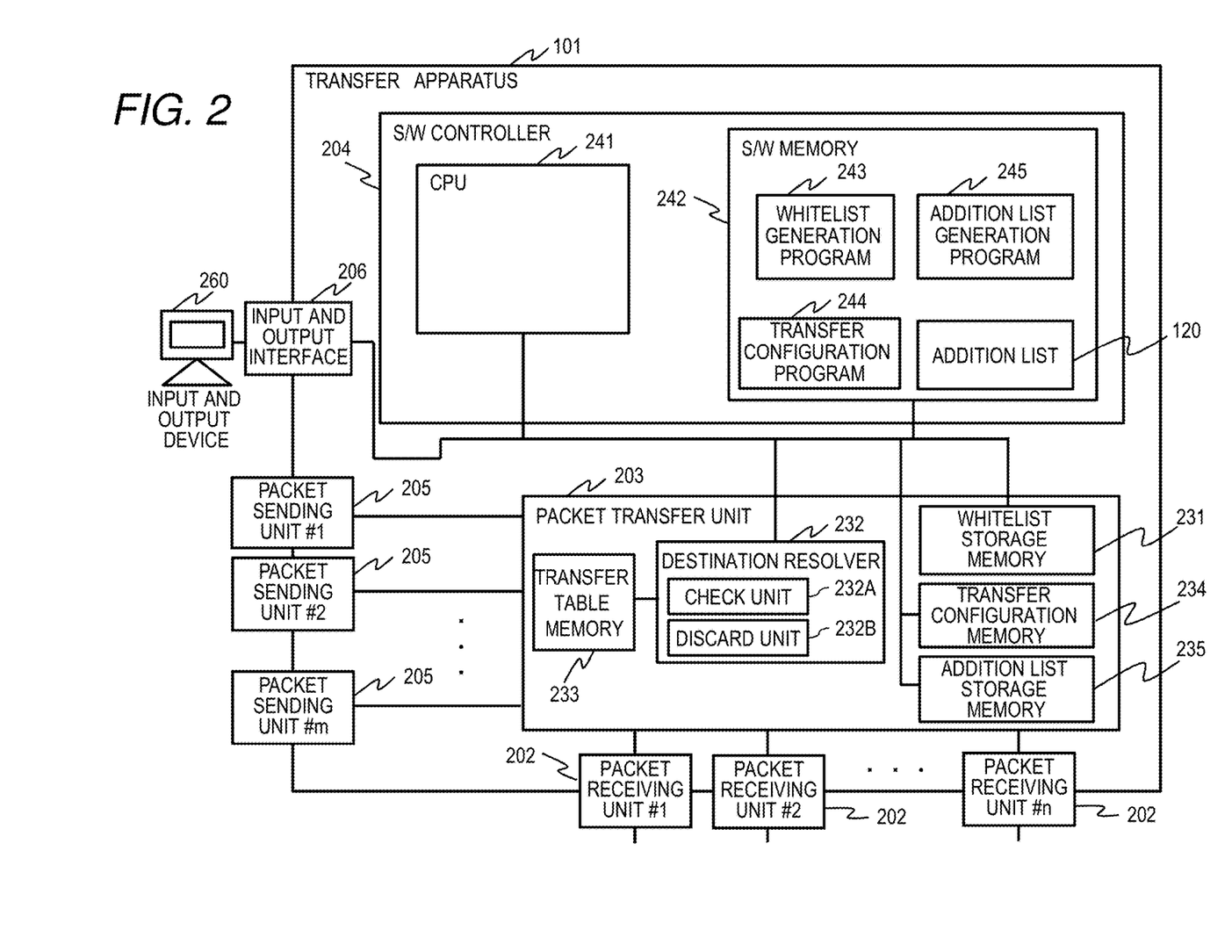
FIG. 2 is a block diagram illustrating a configuration example of the transfer apparatus for relaying packets, which are examples of data.

FIG. 2 is a block diagram illustrating a configuration example of the transfer apparatus 101 for relaying packets, which are examples of data. The transfer apparatus 101 is an example of a communication apparatus. The transfer apparatus 101 relays packets and generates a whitelist 110. The transfer apparatus 101 has a circuit configuration including a plurality of packet receiving units 202, a packet transfer unit 203, a software (S/W) controller 204, a plurality of packet sending units 205, and an input and output interface 206.

Each packet receiving unit 202 has a so-called port; it is connected with an external apparatus such as a terminal or another transfer apparatus 101 through a line such as a metal cable or an optical cable to receive packets from the connected external apparatus. Each packet receiving unit 202 has a packet receiving unit number uniquely identifying the packet receiving unit 202.

Each packet receiving unit 202 that has received a packet adds control information (for example, a packet receiving unit number and a virtual local area network (VLAN) number) associated with the packet receiving unit 202 to the packet. The control information includes information indicating a packet receiving unit group including one or more packet receiving units 202. The packet receiving unit number of the packet receiving unit 202 and the VLAN number, which is the identifier of the VLAN the packet receiving unit 202 belongs to, are examples of control information to be added by the packet receiving unit 202.

The packet transfer unit 203 receives a packet from a packet receiving unit 202 and transfers or discards the received packet in accordance with a whitelist 110 generated by the S/W controller 204. The S/W controller 204 generates the whitelist 110. Each packet sending unit 205 is connected with an external apparatus such as a terminal or another transfer apparatus 101 through a line such as a metal cable or an optical cable and sends the packet received from the packet transfer unit 203 to the connected external apparatus.

The packet receiving units 202 and the packet sending units 205 are usually configured with hardware. Although the packet receiving units 202 and the packet sending units 205 in FIG. 2 are illustrated as separate units for convenience of explanation, a packet receiving unit 202 and a packet sending unit 205 can be integrated into a packet sending and receiving unit.

The input and output interface 206 is connected with an input and output device 260. The input and output interface 206 receives inputs from the user through the input and output device 260. The input and output interface 206 also outputs execution results of programs to the input and output device 260. The input and output device 206 includes an input device for receiving inputs and an output device for outputting processing results of the transfer apparatus 101 in the forms the user can see and understand. Examples of the input device include a keyboard and a mouse and examples of the output device include a monitor and a printer.

Although FIG. 2 shows the input and output device 260 as a device independent from the transfer apparatus 101, the transfer apparatus 101 can include an input and output device 260 such as a monitor and operation buttons.

The packet transfer unit 203 includes a whitelist storage memory 231, a destination determination unit 232, a transfer table memory 233, a transfer configuration memory 234, and an addition list storage memory 235. The whitelist storage memory 231 can be a content addressable memory (CAM) or a dynamic random access memory (DRAM); it stores a whitelist 110 generated by the S/W controller 204.

The transfer table memory 233 can be a CAM or a DRAM; it stores correspondence information between header information (for example, a MAC address, an IP address, and a protocol) of a packet and the destination of the packet or a packet sending unit 205 (for example, a port number). This correspondence information is created by the administrator and stored in the transfer table memory 233 in advance. A MAC address table used for communication in Layer 2 of the open systems interconnection (OSI) reference model and a routing table used for communication in Layer 3 of the OSI reference model are examples of this correspondence information.

The transfer configuration memory 234 can be a DRAM; it stores transfer configuration information 600 indicating the mode of the transfer apparatus 101 and actions to take for a packet unregistered in the whitelist. Although the transfer configuration 600 stored in the transfer configuration memory 234 will be described later, it is configured by the administrator through the input and output device 260. The addition list storage memory 235 can be a DRAM; it stores the addition list 120 shown in FIG. 1.

The destination determination unit 232 receives a packet from a packet receiving unit 202 and searches the transfer table memory 233 with keys of the header information and the control information of the received packet to determine the destination of the received packet. If the header information and the control information of the received packet cannot be found in the transfer table memory 233, the destination determination unit 232 sends the received packet to all ports except for the port where the packet is received.

In the case where the destination determination unit 232 receives a packet during a whitelist operation mode, the destination determination unit 232 works as a check unit 232A that searches the whitelist 110 stored in the whitelist storage memory 231 to check whether the received packet is registered in the whitelist 110. If the received packet is not registered in the whitelist 110, the destination determination unit 232 works as a discard unit 232 that discards the packet.

In the case where the destination determination unit 232 receives a packet during a whitelist generation mode, the destination determination unit 232 extracts predetermined header information (for example, the MAC address, the IP address, the protocol, and the port number) and predetermined control information (for example, the packet receiving unit number and the VLAN number) from the received packet and forwards them to the S/W controller 204. The destination determination unit 232 determines whether to pursue the communication utilizing the whitelist 110 in accordance with the configuration of the transfer configuration memory 234. The whitelist operation mode and the whitelist generation mode will be described later.

The packet transfer unit 203 is usually configured with hardware to achieve high-speed execution of simple commands, such as high-speed whitelist search and wire-rate packet communication. The packet transfer unit 203 can be configured with a field programmable gate array (FPGA).

The S/W controller 204 includes a control processing unit (CPU) 241 and a S/W memory 242. The CPU 241 is a processor for executing programs stored in the S/W memory 242. The S/W memory 242 includes a read only memory (ROM) of a non-volatile storage element and a random access memory (RAM) of a volatile storage element.

The ROM stores persistent programs (for example, basic input/output system (BIOS)). The RAM is a high-speed volatile storage element like a DRAM and stores programs to be executed by the processor and data to be used by the executed programs on a temporary basis.

The S/W memory 242 includes a whitelist generation program 243, a transfer configuration program 244, and an addition list generation program 245. In the case where the packet transfer unit 203 does not have an addition list storage memory 235, the addition list 120 can be stored in the S/W memory 242. The programs stored in the S/W memory 242 are executed by the CPU (processor) 241 to perform predetermined processing with the storage devices and the communication ports (communication devices). Accordingly, in this specification, description having a subject of a program can be description having a subject of the CPU 241. Alternatively, processing performed by a program is processing of the computer or computer system running the program.

The CPU 241 operates in accordance with programs to work as functional units for implementing predetermined functions. For example, the CPU 241 operates in accordance with the whitelist generation program 243, the transfer configuration program 244, and the addition list generation program 245 to work as a whitelist generator, a transfer configuration unit, and an addition list generator, respectively. The CPU 241 further works as functional units for implementing a plurality of processes executed by the programs. A computer and a computer system are an apparatus and a system including these function units.

The whitelist generation program 243 generates a whitelist 110 from the control information and the header information received from the destination determination unit 232 and writes it to the whitelist storage memory 231. The transfer configuration program 244 writes transfer configuration input from the input and output device 260 to the transfer configuration memory 234.

Example of Whitelist 110

Figure 3:
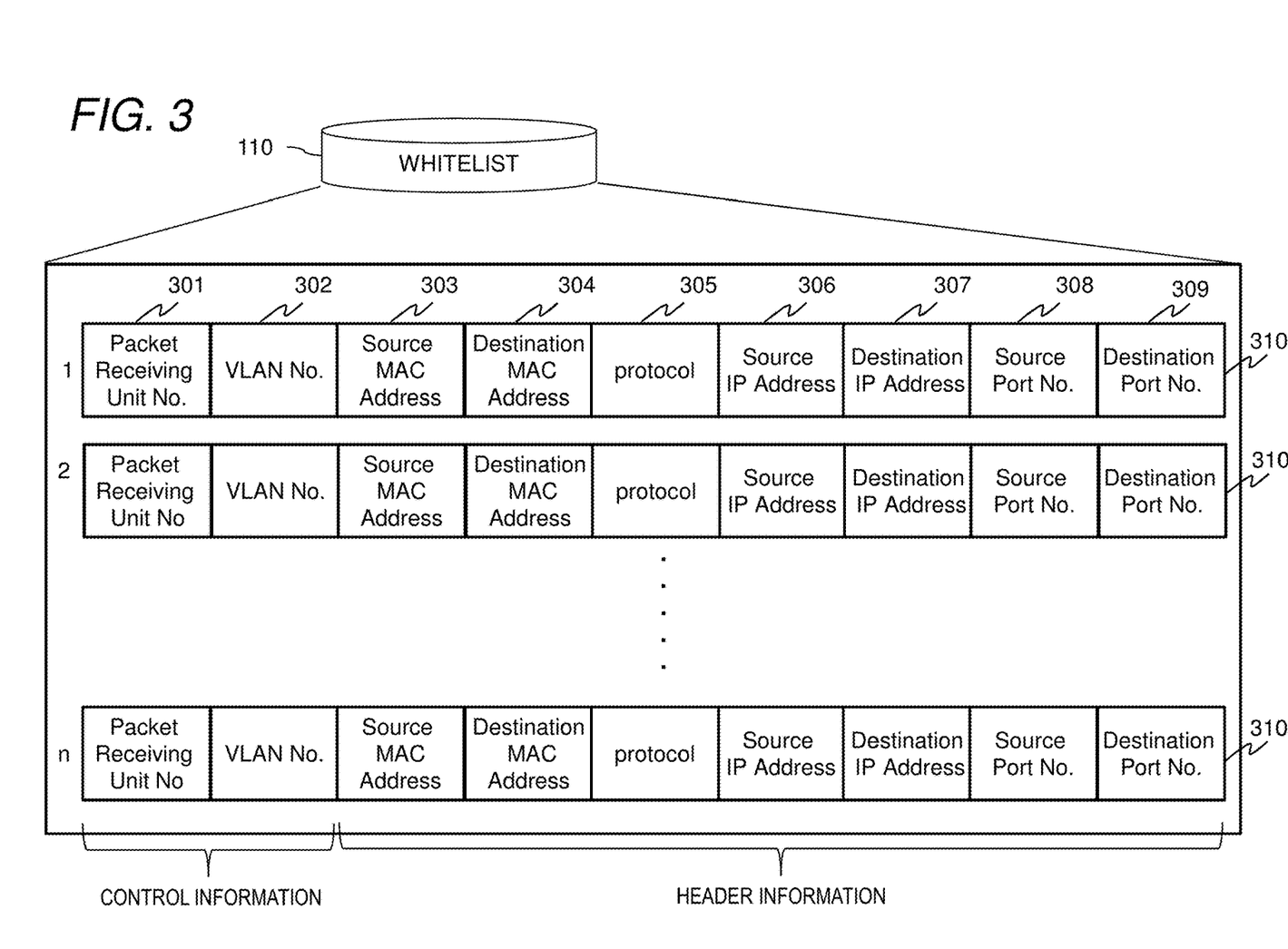
FIG. 3 is an explanatory diagram of an example of the whitelist stored in the whitelist storage memory.

FIG. 3 is an explanatory diagram of an example of the whitelist 110 stored in the whitelist storage memory 231. In the example of FIG. 3, the whitelist 110 has n entries (n is an integer not less than 0). Each entry 310 of the whitelist 110 is packet information 121 including a plurality of parameters. Each of the plurality of parameters is control information or header information extracted by the destination determination unit 232 from a packet received from a packet receiving unit 202. Accordingly, each entry 310 (packet information 121) of the whitelist 110 is reliable information that identifies an authorized packet relayed by the transfer apparatus 101. In other words, each entry registered in the whitelist identifies an authorized communication path.

For example, each entry 310 includes a packet receiving unit number 301 and a VLAN number 302, which are parameters representing control information of a packet. The entry 310 further includes a source MAC address 303, a destination MAC address 304, a protocol 305, a source IP address 306, a destination IP address 307, a source port number 308, and a destination port number 309, which are parameters representing header information of a packet.

The packet receiving unit number 301 is a number for uniquely identifying a packet receiving unit 202. The packet receiving unit number 301 identifies the packet receiving unit 202 that has received a given packet. The VLAN number 302 is a number for uniquely identifying the VLAN the packet receiving unit 202 belongs to.

The source MAC address 303 is the MAC address of the sender of the packet. The destination MAC address 304 is the MAC address of the destination of the packet. The protocol 305 indicates the kind of the protocol. The source IP address 306 is the IP address of the sender of the packet. The destination IP address 307 is the IP address of the destination of the packet. The source port number 308 is the port number of the sender of the packet. The destination port number 309 is the port number of the destination of the packet.

The entry 310 is not limited to the example in FIG. 3; the requirement is to include parameters representing one or more kinds of control information and parameters representing a plurality of kinds of header information. The entry 310 can include header information such as a type of service (TOS), a flag, a time to live (m), an ID, a version, and a header value in place of or in addition to the aforementioned parameters representing header information.

Example of Addition list 120

Figure 4:
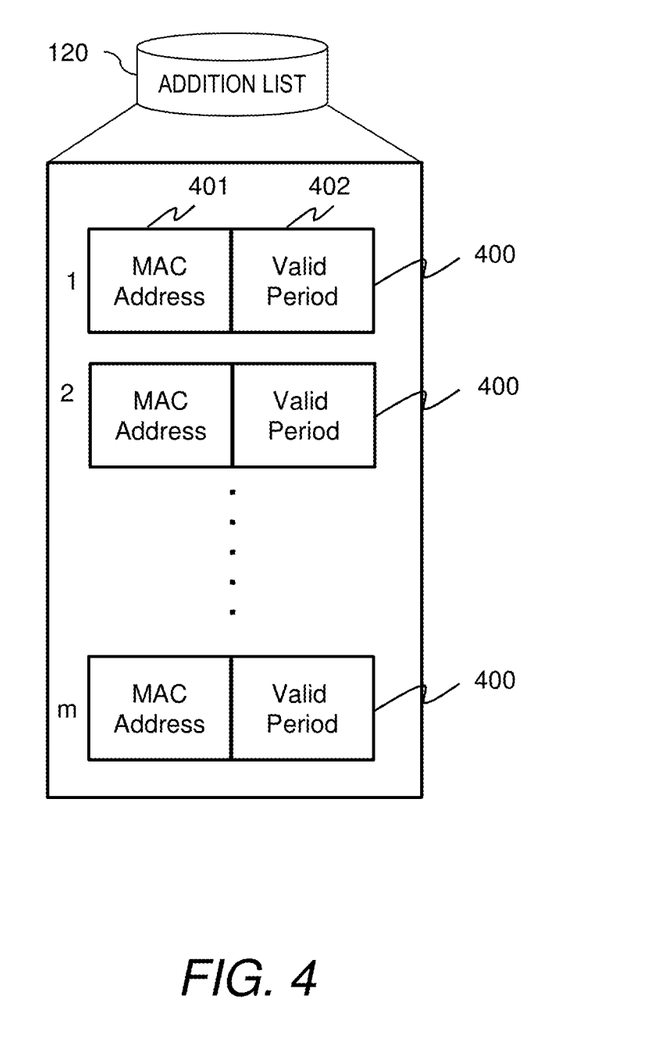
FIG. 4 is an explanatory diagram of an example of the addition list stored in the addition list storage memory.

FIG. 4 is an explanatory diagram of an example of the addition list 120 stored in the addition list storage memory 235. In the example of FIG. 4, the addition list 120 has m entries 400 (m is an integer not less than 0). Each entry 400 of the addition list 120 includes a plurality of parameters. The entry 400 is an example of an entry included in the addition list 120. The entry 400 includes a MAC address 401 as a parameter providing information on the terminal to be added to the whitelist 110 (in FIG. 1, the MAC address 111 of the terminal 104). The entry 400 further includes a valid period 402 as a parameter representing the period for which the entry 400 is valid (in FIG. 1, the valid period 112 of the MAC address 111 of the terminal 104). In an example, the valid period 402 is reduced as the time elapses and when it becomes 0, the entry 400 is deleted.

The entry 400 is not limited to the example in FIG. 4; the requirement is to include one or more parameters representing information on the terminal (for example, the packet receiving unit number 301, the VLAN number 302, the protocol 305, the IP address 306, the source port number 308, and/or the destination port number 309) and a parameter representing the valid period of the entry 400.

Figure 5:
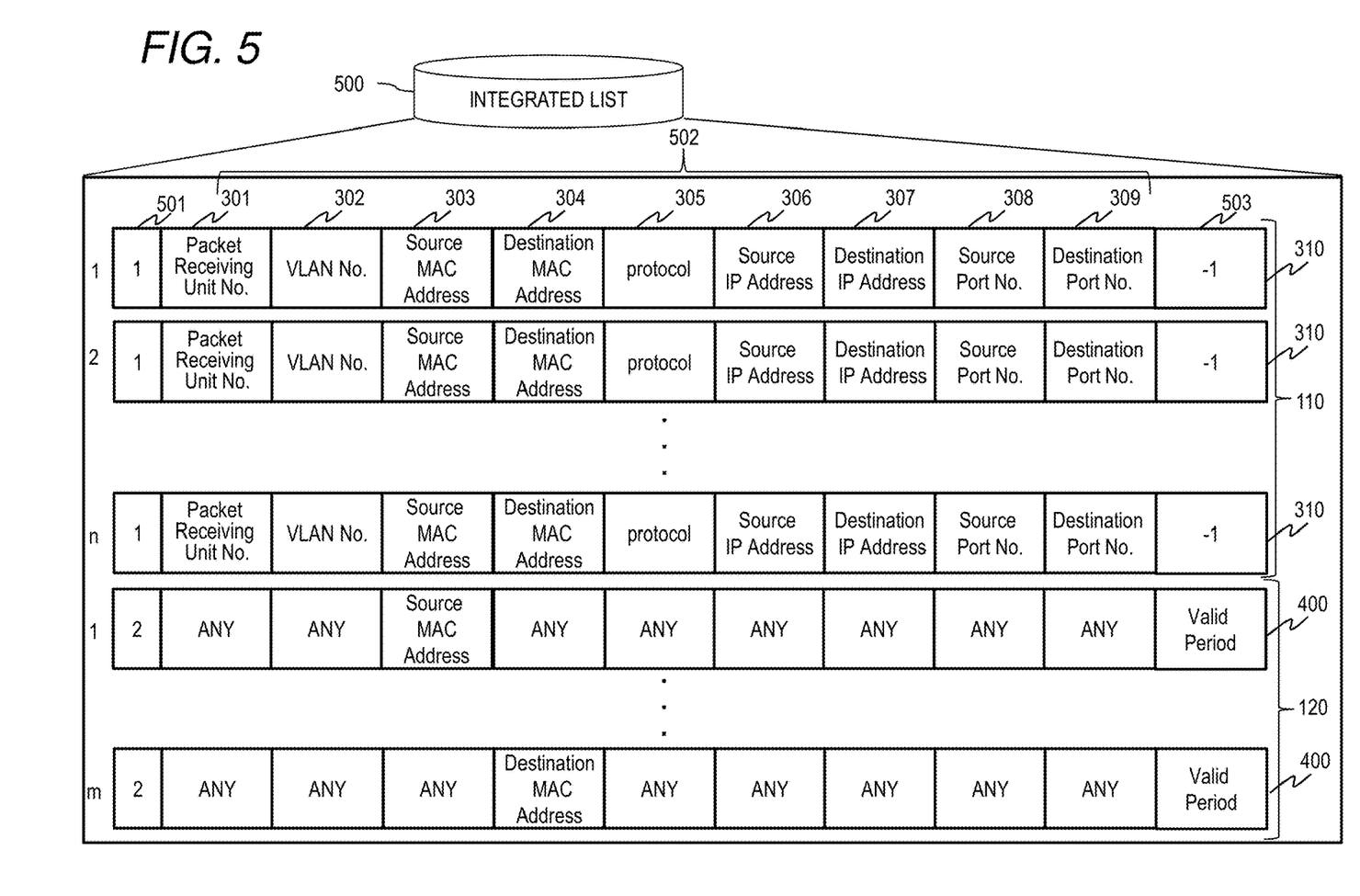
FIG. 5 is an explanatory diagram of an example of an integrated list of the whitelist and the addition list.

The addition list 120 does not need to be stored in the independent addition list storage memory 235 but can be stored in the whitelist storage memory 231 together with the entries 310 of the whitelist 110 as shown in FIG. 5.

FIG. 5 is an explanatory diagram of an example of an integrated list of the whitelist 110 and the addition list 120. The integrated list 500 includes n entries 310 of the whitelist 110 and m entries 400 of the addition list 120. Each of the entries 310 and 400 is specified by the first column 501, the second column 502, and the third column 503. The first column 501 includes a parameter for categorizing the entry as an entry belonging to the white list 110 or an entry belonging to the addition list 120. For example, an entry having a value "1" in the first column 501 belongs to the whitelist 110 and an entry having a value "2" belongs to the addition list 120. As far as the entry can be categorized, any values can be employed.

The second column 502 includes parameters including a packet receiving unit number 301 and a VLAN number 302, a source MAC address 303, a destination MAC address 304, a protocol 305, a source IP address 306, a destination IP address 307, a source port number 308, and a destination port number 309, for example.

The third column 503 specifies a valid period 402. Specifically, the third column 503 of an entry 400 of the addition list 120 includes a parameter indicating the valid period 402 of the entry 400 like the one in FIG. 4; the third column 503 of an entry 310 of the whitelist 110 includes a value "−1" indicating that the valid period 402 is infinite. Any value can be employed as far as it indicates that the valid period 402 is infinite.

As to an entry 310 of the addition list 120, if a specific value is stored for the source MAC address 303, values "ANY" meaning that any value satisfies the requirement are stored for the other parameters 301, 302, and 304 to 309. In similar, if a specific value is stored for the destination MAC address 304, values "ANY" meaning that any value satisfies the requirement are stored for the other parameters 301 to 303, and 305 to 309. A different value can be employed as far as it indicates that any value satisfies the requirement. Since this integrated list allows the transfer apparatus 101 to search the addition list 120 continuously from the whitelist 110, improvement in throughput is expected.

Example of Transfer Configuration Information

Figure 6:
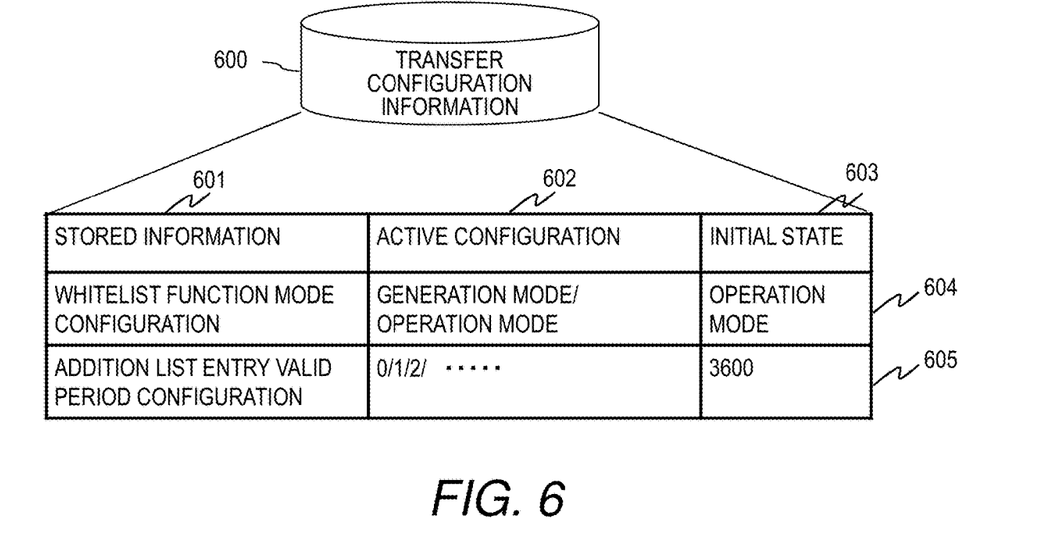
FIG. 6 is an explanatory diagram illustrating an example of transfer configuration information held in the transfer configuration memory.

FIG. 6 is an explanatory diagram illustrating an example of transfer configuration information held in the transfer configuration memory 234. The transfer configuration information 600 includes stored information 601 indicating the kind of transfer configuration, active configuration 602 indicating the status of the stored information 601, and an initial state 603 indicating the initial state of the stored information 601, for example. Although each cell of the active configuration 602 in FIG. 6 shows a plurality of values sectioned by a slash (/), the actual transfer configuration information 600 has one of these values. The initial state 603 is one of the plurality of values shown in the active configuration 602 of the same record.

The record 604 is a record for specifying the whitelist function as stored information 601. Specifically, it specifies that the active configuration 602 is generation mode/operation mode and the initial state 603 is operation mode.

The record 605 is a record specifying the valid period 402 for the entries of the addition list 120 as stored information 601. Specifically, it specifies that the active configuration 602 is a valid period 402 such as 0/1/2/ . . . and the initial state 603 is a default value of "3600" for the valid period 402 in the addition list 120. The value of the initial state 603 is employed for the valid period 402 if no value is provided for the active configuration 602.

Hereinafter, examples of operation of the transfer apparatus 101 in accordance with the transfer configuration information 600 are described. Upon receipt of a packet, the destination determination unit 232 accesses the transfer configuration memory 234 to determine whether the active configuration 602 of the record 604 is generation mode for generating a whitelist 110 or operation mode for transferring packets in accordance with the whitelist 110.

The following is an example of operation in the case where the active configuration 602 of the record 604 is generation mode. The destination determination unit 232 sends the header information and the control information of the received packet to the whitelist generation program 243 being executed by the CPU 241, while performing packet transfer processing on the received packet. The CPU 241 generates a whitelist 110 from the header information and the control information of the packet received from the destination determination unit 232 with the whitelist generation program 243 and writes the generated information to the whitelist storage memory 231.

The following is an example of operation in the case where the active configuration 602 of the record 604 is operation mode. The destination determination unit 232 checks whether the packet received from the packet receiving unit 202 is registered in the whitelist 110 stored in the whitelist storage memory 231. If this packet is registered in the whitelist 110, the destination determination unit 232 performs packet transfer processing on the received packet.

If the packet is not registered in the whitelist 110, the destination determination unit 232 accesses the addition list storage memory 235 to determine whether the addition list 120 includes the MAC address included in the packet. If the addition list 120 includes the MAC address, the operation in the case where the active configuration 602 of the record 604 is operation mode is performed. If the addition list 120 does not include the MAC address, the destination transfer unit 232 discards the packet with the discard unit 232B.

Example of Transfer Configuration Command List

Figure 7:
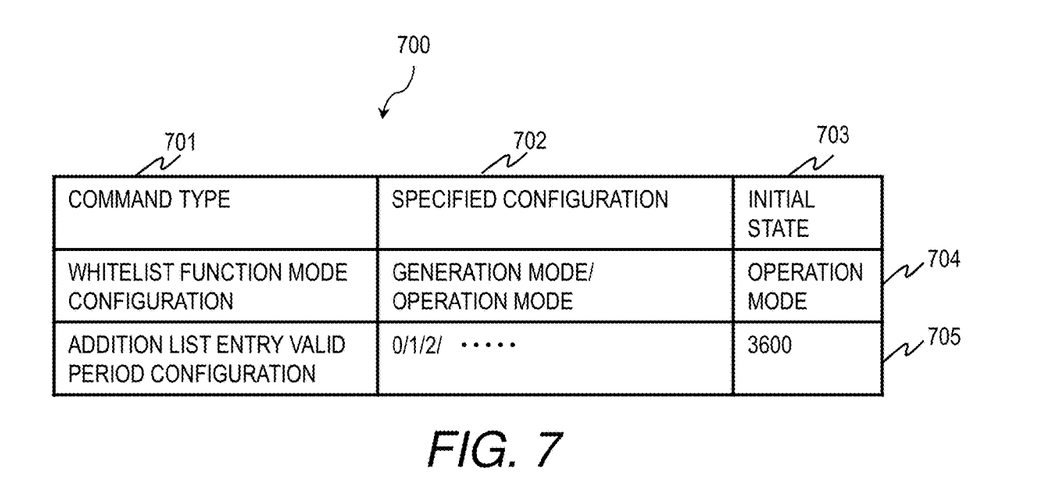
FIG. 7 is an explanatory diagram of an example of a transfer configuration command list the transfer configuration program is to receive from the input and output device.

FIG. 7 is an explanatory diagram of an example of a transfer configuration command list the transfer configuration program 244 is to receive from the input and output device 260. The transfer configuration command list 700 includes a command type 701 indicating the type of the command, specified configuration 702 providing the configuration specified by the command in the command type 701, and an initial state 703 for each command, for example. When a transfer configuration command list 700 is input to the transfer apparatus 101 from the input and output device 260, the transfer apparatus 101 configures transfer configuration information 600 in the transfer configuration memory 234.

The commands shown in the records 704 and 705 are commands to change the transfer configuration shown in the records 604 and 605 in the transfer configuration memory 234. The command types 701, the specified configuration 702, and the initial states 703 of the records 704 and 705 correspond to the stored information 601, the active configuration 602, and the initial states 603, respectively, of the records 604 and 605 in the transfer configuration memory 234.

If a value is provided in the specified configuration 702 of the record 705, the value is set to the active configuration 602 of the record 605. However, if no value is provided in the specified configuration 702 of the record 705, no value is set to the active configuration 602 of the record 605 of the transfer configuration information 600. In this case, the value of the initial state 703 in the record 705 is set to the initial state 603 of the record 605.

Examples of Operation Flow of Transfer Apparatus 101

Figure 8:
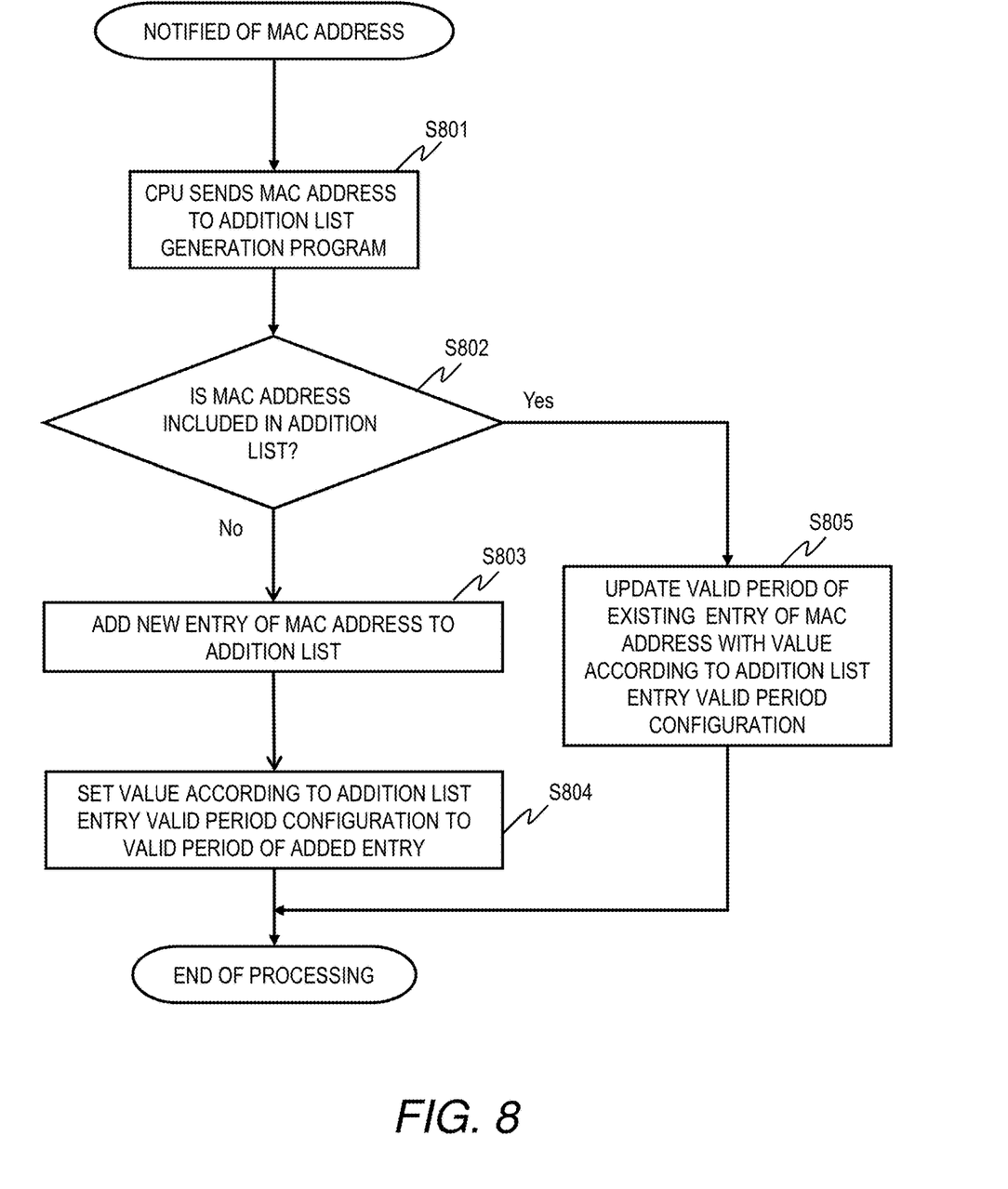
FIG. 8 is a flowchart of operation of the transfer apparatus to generate an entry in the addition list 120.

FIG. 8 is a flowchart of operation of the transfer apparatus 101 to generate an entry 400 in the addition list 120. When the transfer apparatus 101 is notified of a MAC address from the input and output device 260, the CPU 241 sends the MAC address to the addition list generation program 245 (Step S801).

The addition list generation program 245 searches the addition list storage memory 235 with the received MAC address to check whether the received MAC address is included in the addition list 120 (Step S802). For example, when the MAC address is to be registered to the addition list 120 for the first time or after the valid period 402 has expired, the MAC address is not included in the addition list 120.

If the MAC address is not included in the addition list 120 like in the above-described cases (Step S802: No), the addition list generation program 245 registers the received MAC address to the addition list as a new entry 400 (Step S803), sets the value of the record 605 in the transfer configuration information to the valid period 402 of this entry 400 (Step S804), and terminates the processing.

If the MAC address is included in the addition list 120 (Step S802: Yes), the addition list generation program 245 updates the valid period 402 of the entry 400 of this MAC address with the value of the record 605 in the transfer configuration information (Step S805) and terminates the processing. The value of the record 605 in the transfer configuration information means the value of the active configuration 602 if it exists, and the value of the initial state 603 otherwise. The transfer apparatus 101 starts count-down from the updated value of the valid period 402. Accordingly, extension of the valid period 402 is available if the administrator makes the transfer apparatus 101 perform the processing in the case of Step S802: Yes and S805.

The record 605 can be altered by the administrator inputting the record 705 with the input and output device 260 as described above. In the meanwhile, the value of the record 605 is set to the valid periods 402 in the addition list 402; however, all entries 400 of the addition list 120 do not need to include the same value. The addition list 120 can be configured to store a different value in each entry. For example, the value can be specified by the administrator with the input and output device 260 together with input of a MAC address.

Figure 9:
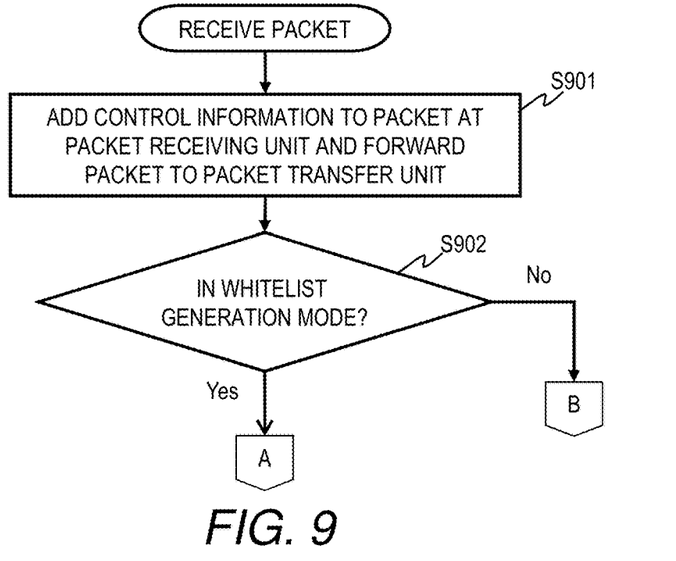
FIG. 9 is a flowchart of operation of the transfer apparatus in accordance with the active configuration in the record of the transfer configuration information in response to receipt of a packet from the external.

FIG. 9 is a flowchart of operation of the transfer apparatus 101 in accordance with the active configuration 702 in the record 704 of the transfer configuration information in response to receipt of a packet from the external. When one of the packet receiving units 202 of the transfer apparatus 101 receives a packet, the packet receiving unit 202 adds above-described control information to the received packet and forwards the packet to the destination determination unit 232 (Step S901). Upon receipt of the packet, the destination determination unit 232 checks the active configuration 602 (generation mode/operation mode) of the record 604 of the transfer configuration information 600 to determine whether the transfer apparatus is in the whitelist generation mode to generate a whitelist 110 or the whitelist operation mode to transfer packets using the whitelist 110 (Step S902).

If the result of the determination (Step S902) is the whitelist generation mode (Step S902: Yes), the transfer apparatus 101 proceeds to Step S1001 in FIG. 10 to be described later and automatically generates a whitelist 110. If the result of the determination (Step S902) is the whitelist operation mode (Step S902: No), the transfer apparatus 101 proceeds to Step S1101 in FIG. 11 to be described later and controls communication based on the generated whitelist 110.

As described above, the whitelist generation mode and the whitelist operation mode are switched in accordance with input of the administrator through the input and output device 260. The whitelist generation mode is chosen in a sterile period when constructing a network, for example. The transfer apparatus 101 can generate a whitelist 110 automatically when authorized communication is performed in the sterile period. Thereafter, the administrator switches the mode to the whitelist operation mode.

Figure 10:
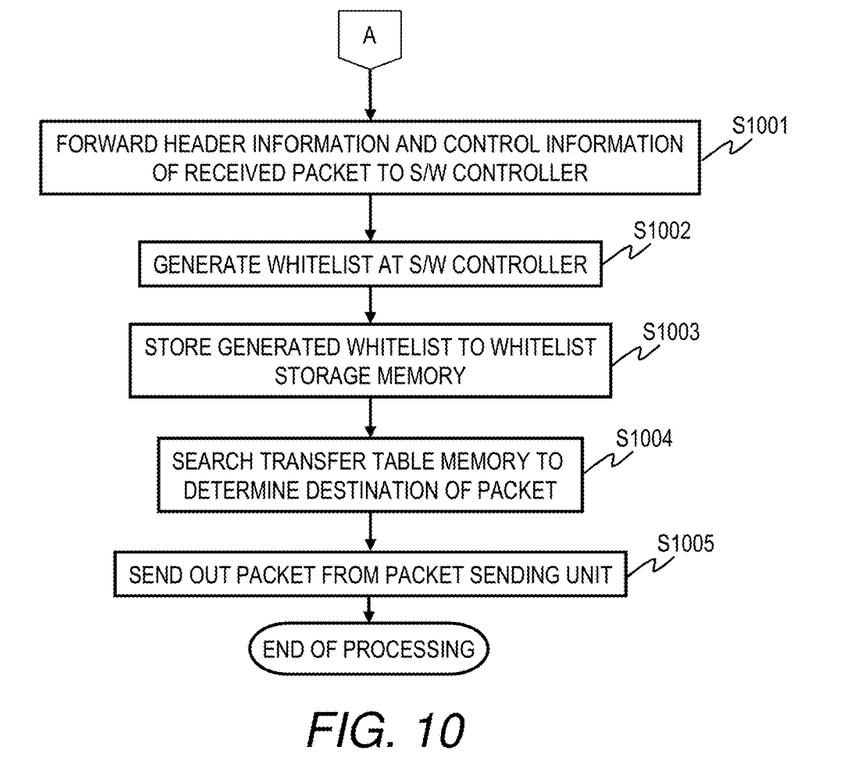
FIG. 10 is a flowchart of an example of the operation in the case where the determination at Step S902 in FIG. 9 is that the transfer apparatus is in the whitelist generation mode (Step S902: Yes).

FIG. 10 is a flowchart of an example of the operation in the case where the determination at Step S902 in FIG. 9 is that the transfer apparatus 101 is in the whitelist generation mode (Step S902: Yes). The destination determination unit 232 in receipt of the packet forwards the header information and the control information of the received packet to the S/W controller 204 (Step S1001).

Upon receipt of the header information and the control information of the received packet, the S/W controller 204 makes the CPU 241 therein work as a whitelist generator to generate a whitelist 110 from the header information and the control information in accordance with the information shown in FIG. 3 (Step S1002).

The CPU 241 working as a whitelist generator further writes the generated whitelist 110 to the whitelist storage memory 231 (Step S1003). The destination determination unit 232 searches the transfer table memory 233 with keys of the header information and the control information of the received packet to determine the destination (Step S1004). The destination determination unit 232 registers the header information and the control information of the received packet to the transfer table 130. If the header information and the control information of the received packet is not registered in the transfer table memory 233 in determining the destination, the destination determination unit 232 determines to transfer the packet to all ports except for the port where the packet is received. The packet transfer unit 203 sends out the packet for which the destination is determined by the destination determination unit 232 from the packet sending unit 205 having the pertinent port number (Step S1005) and terminates the processing.

Figure 11:
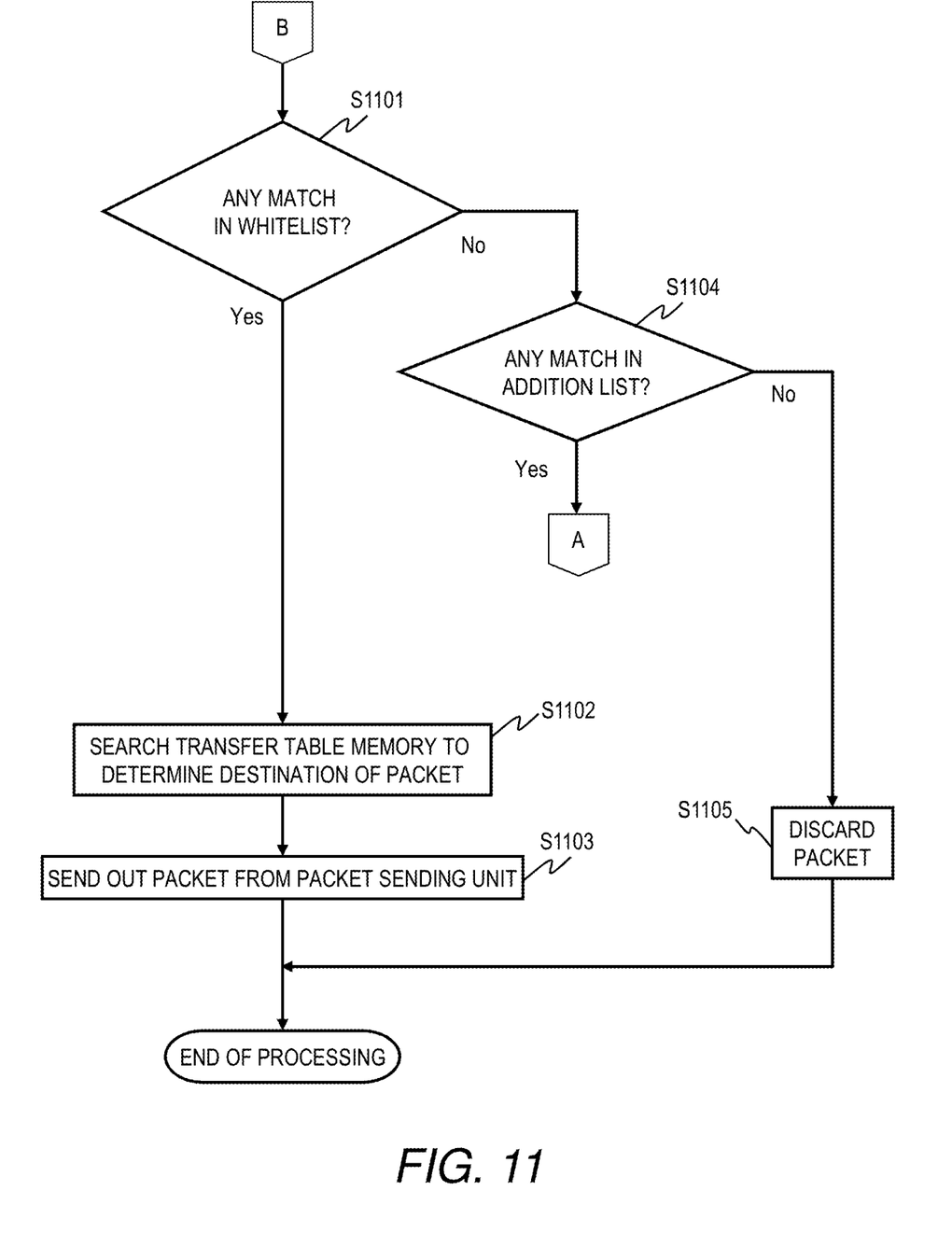
FIG. 11 is a flowchart of the operation of the transfer apparatus in the case where the determination at Step S902 in FIG. 9 is that the transfer apparatus is in the whitelist operation mode.

FIG. 11 is a flowchart of the operation of the transfer apparatus 101 in the case where the determination at Step S902 in FIG. 9 is that the transfer apparatus 101 is in the whitelist operation mode. The destination determination unit 232 in receipt of the packet searches the whitelist storage memory 231 to determine whether the header information and the control information of the received packet are included in the whitelist 110 (Step S1101). If they are included (Step S1101: Yes), the destination determination unit 232 searches the transfer table memory 233 with keys of the header information and the control information of the received packet to determine the destination (Step S1102). The destination determination unit 232 registers the header information and the control information of the received packet to the transfer table 130. If the header information and the control information of the received packet is not registered in the transfer table memory 233 in determining the destination, the destination determination unit 232 determines to transfer the packet to all ports except for the port where the packet is received. The packet transfer unit 203 sends out the packet for which the destination is determined by the destination determination unit 232 from the packet sending unit 205 having the pertinent port number (Step S1103) and terminates the processing.

If the header information and the control information of the received packet are not included in the whitelist 110 (Step S1101: No), the destination determination unit 232 searches the addition list storage memory 235 with keys of the source MAC address and the destination MAC address of the received packet (Step S1104). If either the source MAC address or the destination MAC address of the received packet is included in the addition list 120 (Step S1104: Yes), the destination determination unit 232 proceeds to the aforementioned Step S1001 in FIG. 10 and performs the same processing as the processing in the whitelist generation mode. If neither the source MAC address nor the destination MAC address of the received packet is included in the addition list 120 (Step S1104: No), the destination determination unit 232 discards the packet (Step S1105) and terminates the processing.

[1] As described above, the transfer apparatus 101 has a whitelist storage memory 231 (an example of a first storage unit) for storing a whitelist 110 for registering packet information 121 (an example of reliable information) indicating that communication between a source address and a destination address is authorized; an addition list storage memory 235 (an example of a second storage unit) for storing an addition list 120 including a specific MAC address 401 (an example of a specific address) not included in the packet information 121 and a valid period 402 of the specific MAC address 401; a packet receiving unit 202 (an example of a receiving unit) for receiving a packet (an example of data); a check unit 232A for checking whether either a destination MAC address (an example of a destination address) or a source MAC address (an example of a source address) included in a packet received at the packet receiving unit 202 within the valid period 402 is the specific MAC address 401; and a generation unit (implemented by making a CPU 241 execute a whitelist generation program 243) for generating specific packet information 121 indicating that communication between the destination MAC address and the source MAC address included in the packet is authorized and registering the generated specific packet information 121 to the whitelist 110 if the check unit 232A confirms within the valid period 402 that either address is the specific MAC address 401.

This configuration enables the transfer apparatus 101 to transfer a packet to or from an admissible terminal 104 having a specific MAC address 401 within a valid period 402. Accordingly, registration to the whitelist 110 is available if the administrator inputs the MAC address 111 of the newly added terminal 104. Thus, the necessity of picking up the communication parameters other than the MAC address is eliminated. As a result, the load to the administrator or misregistration to the whitelist is reduced.

[2] In the transfer apparatus 101 described in the foregoing [1], the check unit 232A checks whether the specific packet information 121 is registered in the whitelist 110 and if the specific packet information 121 is not registered in the whitelist 110, further checks whether the either address is the specific MAC address 401 within the valid period 402.

This configuration eliminates the necessity of checking whether the either address is the MAC address 401 within the valid period 402 if the specific packet information 121 is registered in the whitelist 110. Accordingly, the transfer efficiency improves. Meanwhile, if the specific packet information 121 is not registered in the whitelist 110, whether the either address is the specific MAC address 401 is checked within the valid period 402. Accordingly, if the administrator inputs the MAC address 111 of the newly added terminal 104, registration to the whitelist 110 becomes available. Thus, the necessity of checking the communication parameters other than the MAC address is eliminated. As a result, the load to the administrator or misregistration to the whitelist is be reduced.

[3] The transfer apparatus 101 described in the foregoing [1] further has a discard unit 232B for discarding the packet if the check unit 232A finds out that neither address is the specific MAC address 401 or that the valid period 402 has expired.

This configuration prevents transfer of a packet identified by packet information unregistered in the whitelist 110.

[4] The transfer apparatus 101 described in the foregoing [1] further has a transfer table memory 233 (an example of a third storage unit) for storing a transfer table 130 including the MAC addresses of communication apparatuses connected with the transfer apparatus 101 and the port numbers of the ports connected with those communication apparatuses; a destination determination unit 232 (an example of a determination unit) for determining the destination of a packet with reference to the transfer table memory 233 after the specific packet information 121 generated by the generation unit is registered to the whitelist 110; and a packet sending unit 205 (an example of a sending unit) for sending a packet to the destination determined by the destination determination unit 232.

This configuration enables a packet to or from the newly added terminal 104 to be safely transferred to the destination.

[5] The transfer apparatus 101 described in the foregoing [1] further has a setting unit (implemented by making the CPU 241 execute a transfer configuration program 244) for setting the transfer apparatus 101 to a whitelist generation mode (an example of the first mode) in which packet transfer is restricted to within a specific network and the generation unit generates a whitelist 110 or a whitelist operation mode (an example of the second mode) in which packet transfer is permitted to and from outside of the specific network. In the whitelist operation mode set by the setting unit, the check unit 232A checks within the valid period 402 whether the either address is the specific MAC address 401. If the check unit 232A confirms that the either address is the specific MAC address 401 within the valid period 402, the generation unit generates specific packet information 121 indicating that communication between the destination MAC address and the source MAC address included in the packet is authorized within the valid period 402 and registers the generated specific packet information 121 to the whitelist 110.

This configuration eliminates the necessity of switching to the whitelist generation mode to register the specific packet information 121 to the whitelist 110. For this reason, the operation of the whitelist function is not interrupted. Accordingly, the safety of the network communication improves. Furthermore, securing a sterile state in constructing a network is also unnecessary because switching to the whitelist generation mode is unnecessary. Accordingly, this transfer apparatus 101 is applicable to a network that is difficult to put back to a sterile state once its operation is started.

[6] In the transfer apparatus 101 described in the foregoing [1], the whitelist 110 and the addition list 120 can be configured to have common columns (501 to 503) in the storage area of the same storage device. The common columns include a first column 501 indicating to which of the whitelist 110 and the addition list 110 the entries 310 of the whitelist 110 and the entries 400 of the addition list 120 belong to, a second column 502 specifying packet information 121, and a third column 503 specifying valid periods 402. Each entry 310 of the whitelist 110 has a value (for example, −1) indicating that the valid period 402 is unlimited in the third column 503. Each entry 400 of the addition list 120 specifies either a source MAC address 303 or a destination MAC address 304 in the second column 502 and includes a value (for example, ANY) indicating that the value is not limited to a specific value for each parameter other than the specified MAC address in the second column 502.

This configuration enables the transfer apparatus 101 to search the whitelist 110 and the addition list 120 continuously in the same storage device. In other words, memory accesses between the whitelist storage memory 231 and the addition list storage memory 235 are reduced to improve the throughput of the processing.

[7] The transfer apparatus 101 described in the foregoing [1] has a CPU 241 for executing an addition list generation program 245 for generating a specific MAC address 401 and the valid period 402 of the specific MAC address 401 and storing them to the addition list 120; a S/W memory 242 (an example of a fourth storage unit) for storing the addition list generation program 245; and a packet transfer unit 203 (an example of a circuit) for executing the check by the check unit 232A. The packet transfer unit 203 includes the addition list storage memory 235.

This configuration expedites searching of the addition list 120.

[8] The transfer apparatus 101 described in the foregoing [1] has a CPU 241 for executing an addition list generation program 245 for generating a specific MAC address 401 and the valid period 402 of the specific MAC address 401 and storing them to the addition list 120; and a S/W memory 242 for storing the addition list generation program 245 and the addition list 120.

The S/W memory 242 stores the specific MAC address 401 and the valid period 402 generated by the addition list generation program 245 in the addition list 120.

This configuration allows the memory in the packet transfer unit 203 to have a smaller capacity.

[9] Another transfer apparatus 101 has a S/W memory 242 (an example of a storage unit) for storing an addition list 120 including a specific MAC address 401 and a valid period 402 of the specific MAC address 402; a packet receiving unit 202 for receiving packets; a check unit 232A for checking whether an address included in a packet received by the packet receiving unit 202 within the valid period 402 is the specific MAC address 401; a discard unit 232B for discarding the packet if the check unit 232A finds out that the packet does not include the specific MAC address or the valid period 402 has expired; and a packet sending unit 205 for sending the packet to the destination if the check unit 232A confirms that the address included in the packet is the specific MAC address 401 within the valid period 402.

This configuration enables a transfer apparatus that does not have a whitelist 110 to transfer or discard a packet from or to an admissible terminal 104 having a specific MAC address 401.

As set forth above, this invention has been described in detail with reference to the accompanying drawings; however, this invention is not limited to such a specific configuration but includes various modifications within the scope of the appended claims and equivalent configurations thereto.

What is claimed is:

1. A transfer apparatus comprising:
   a first storage device configured to store a whitelist for storing reliable information indicating that communication between a source address and a destination address is authorized;
   a second storage device configured to store an addition list including a specific address not included in the reliable information and a valid period of the specific address;
   a receiving unit configured to receive data; and
   a processor configured to:
   check whether either a destination address or a source address included in data received at the receiving unit within the valid period is the specific address;
   generate specific reliable information indicating that communication between the destination address and the source address included in the data is authorized and register the generated specific reliable information to the whitelist in a case where the checking by the processor confirms within the valid period that either address is the specific address;
   check whether the specific reliable information is registered in the whitelist; and
   check whether the either address is the specific address within the valid period in a case where the specific reliable information is not registered in the whitelist.

2. The transfer apparatus according to claim 1, wherein the processor is further configured to:
   discard the data in a case where the checking by the processor finds out that neither address is the specific address or that the valid period has expired.

3. The transfer apparatus according to claim 1, further comprising:
   a third storage device configured to store a transfer table including MAC addresses of communication apparatuses connected with the transfer apparatus and port numbers of ports connected with the communication apparatuses,
   wherein the processor is further configured to:
   determine a destination of the data with reference to the transfer table after the specific reliable information is registered to the whitelist; and
   send the data to the determined destination.

4. The transfer apparatus according to claim 1,
   wherein the processor is further configured to:
   generate the specific address and the valid period of the specific address and store the generated specific address and the valid period to the addition list; and
   wherein the transfer apparatus further comprises:
   a third storage device configured to store a program executed by the processor and the addition list,
   wherein the third storage device is configured to store the specific address and the valid period of the specific address generated by the program in the addition list.

5. A transfer apparatus comprising:

a first storage device configured to store a whitelist for storing reliable information indicating that communication between a source address and a destination address is authorized;

a second storage device configured to store an addition list including a specific address not included in the reliable information and a valid period of the specific address;

a receiving unit configured to receive data; and a processor configured to:

check whether either a destination address or a source address included in data received at the receiving unit within the valid period is the specific address;

generate specific reliable information indicating that communication between the destination address and the source address included in the data is authorized and register the generated specific reliable information to the whitelist in a case where the checking by the processor confirms within the valid period that either address is the specific address;

set the transfer apparatus to a first mode in which data transfer is restricted to within a specific network and generate a whitelist or a second mode in which data transfer is permitted to and from outside of the specific network;

check within the valid period whether the either address is the specific address in the second mode; and generate the specific reliable information indicating that communication between the destination address and the source address included in the data is authorized within the valid period and register the generated specific reliable information to the whitelist in a case where the checking by the processor confirms that the either address is the specific address within the valid period.

6. A transfer apparatus comprising:

a first storage device configured to store a whitelist for storing reliable information indicating that communication between a source address and a destination address is authorized;

a second storage device configured to store an addition list including a specific address not included in the reliable information and a valid period of the specific address;

a receiving unit configured to receive data; and a processor configured to:

check whether either a destination address or a source address included in data received at the receiving unit within the valid period is the specific address; and generate specific reliable information indicating that communication between the destination address and the source address included in the data is authorized and register the generated specific reliable information to the whitelist in a case where the checking by the processor confirms within the valid period that either address is the specific address, wherein the whitelist and the addition list are configured to have common columns in a storage area of the same storage device, wherein the common columns include a first column indicating to which of the whitelist and the addition list entries of the whitelist and entries of the addition list belong to, a second column specifying reliable information, and a third column specifying valid periods, wherein each entry of the whitelist has a value indicating that the valid period is unlimited in the third column, and wherein each entry of the addition list specifies either a source MAC address or a destination MAC address in the second column and includes a value indicating that the value is not limited to a specific value for each parameter other than the either specified MAC address in the second column.

7. The transfer apparatus according to claim 1, wherein the processor is further configured to:

execute a program configured to generate the specific address and the valid period of the specific address and store the generated specific address and the valid period to the addition list; and wherein the transfer apparatus further comprises:

a third storage device configured to store a program executed by the processor; and a circuit configured to execute the checking by the processor, wherein the circuit includes the second storage device.

* * * * *